Jan. 30, 1962 J. M. EITEL 3,018,998
CABLE STRINGING APPARATUS AND METHOD
Filed April 22, 1960 2 Sheets-Sheet 2
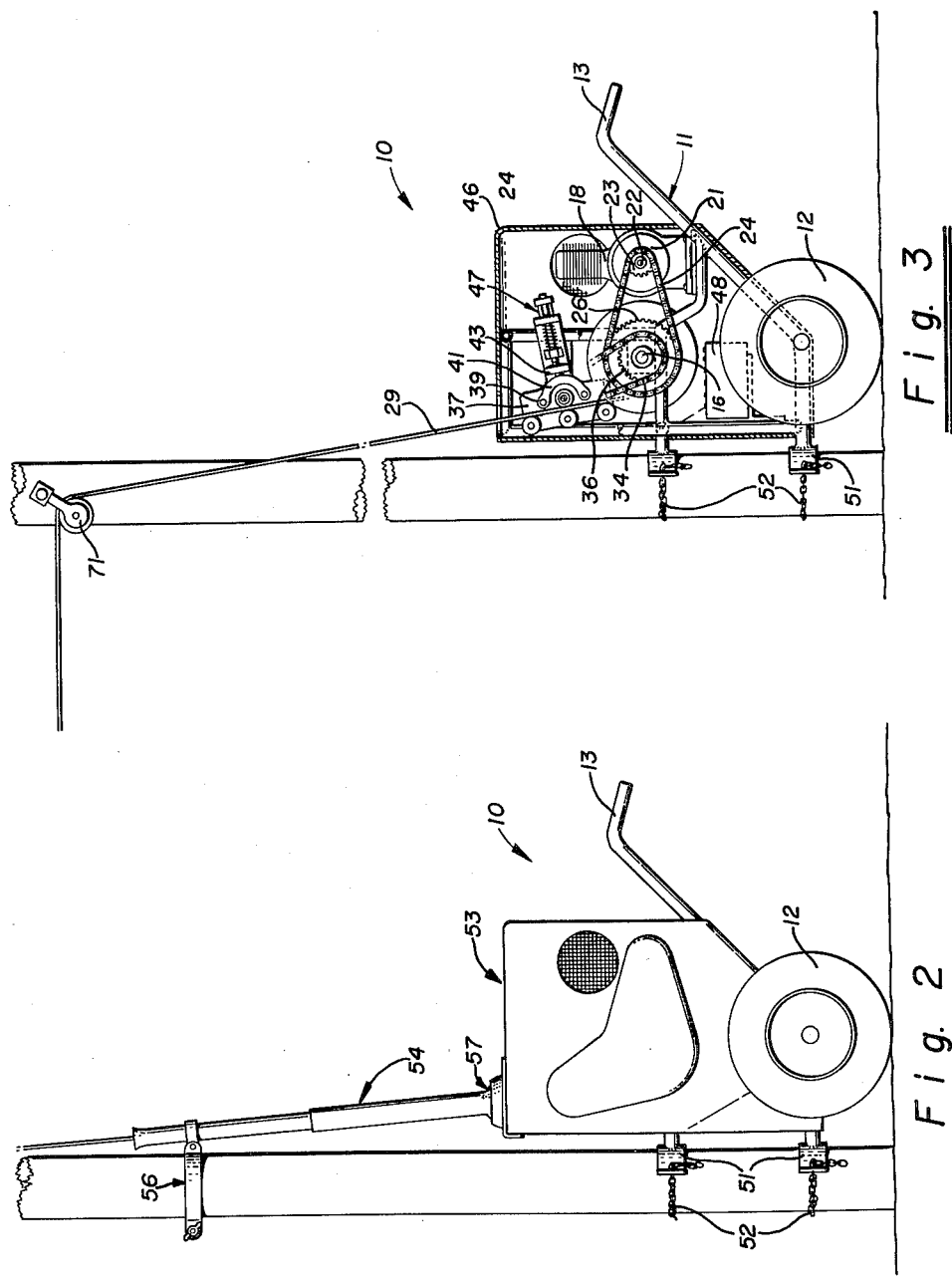
INVENTOR.
Jay M. Eitel
BY
Attorneys United States Patent Office 3,018,998
Patented Jan. 30, 1962

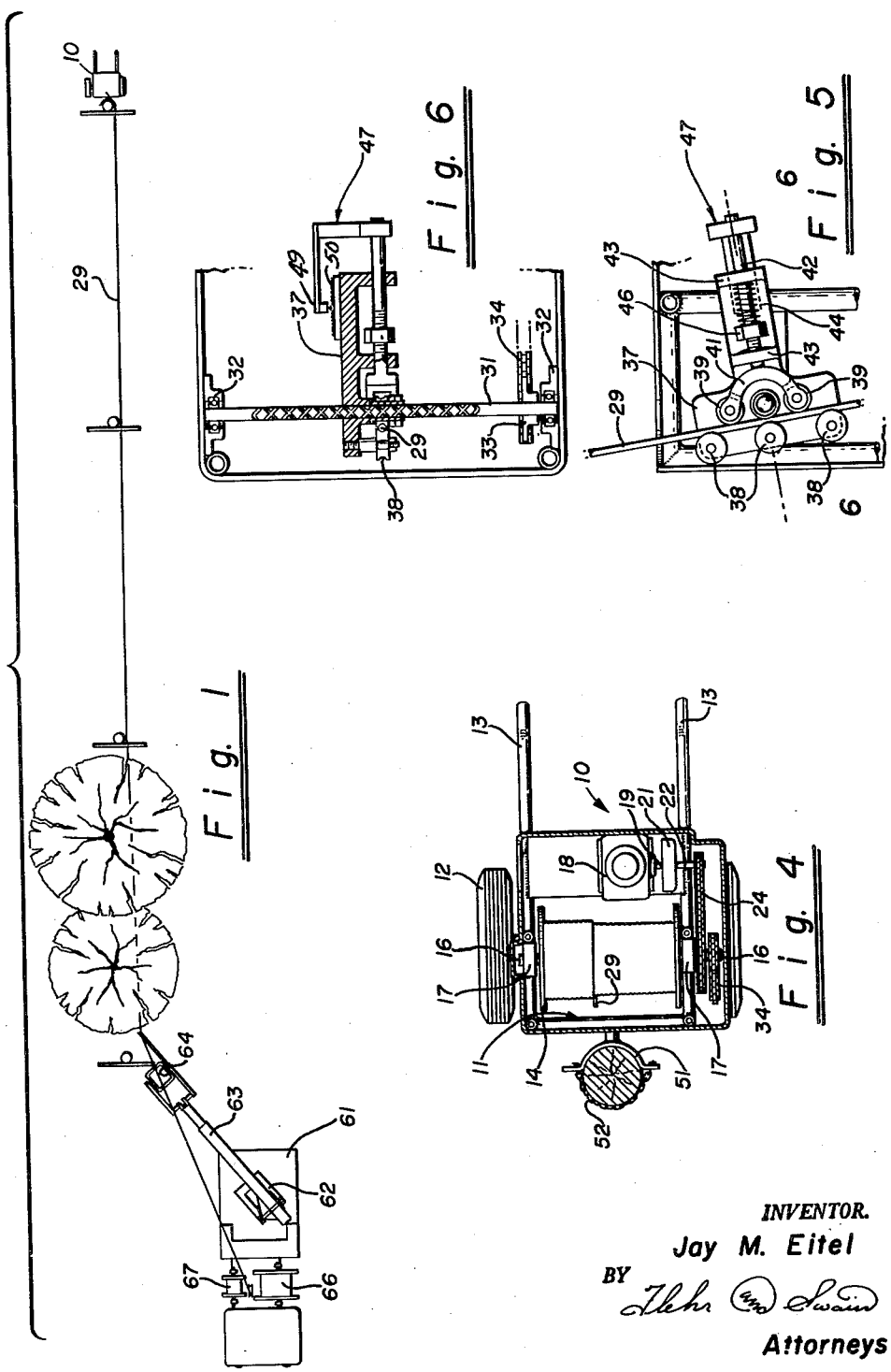

3,018,998
CABLE STRINGING APPARATUS AND METHOD
Jay M. Eitel, 239 Frances Drive, Los Altos, Calif.
Filed Apr. 22, 1960, Ser. No. 24,149
6 Claims. (Cl. 254—134.3)

This invention relates to a cable stringing apparatus and method, and more particularly to a cable stringing apparatus and method which is adapted particularly for stringing cable through trees and on the field side of poles.

Heretofore in placing cable or strand on the field side of poles, a stationary trailer has been placed near the first pole. Thereafter, with a vehicle of the type described in Patent No. 2,896,750, with one man driving the vehicle and with another man in the basket, the vehicle is driven down the road pulling the strand or cable from the trailer to the next pole. This method of cable placement is objectionable because with a two-man crew, the trailer must be left unattended. Such an unattended trailer is a hazard to small children playing in the area because the children are often attracted to such devices. They can be injured by the rotating cable reel on the trailer or by movement of the cable as the cable or strand is pulled from the reel. Such a method and apparatus also has additional disadvantages because as the strand or cable is pulled from the reel, the strand or cable may become slack so that it catches on certain obstructions. Continued pulling of the cable tightens it and may cause it to snap loose from the obstruction and whip into cars, pedestrians, high voltage power lines and the like which may be in the vicinity to create a very dangerous situation. In addition, the trailers utilized with such a method are generally quite costly and require considerable time for loading and unloading. It is, therefore, apparent that there is a need for a new and improved method and apparatus for stringing cable.

In general, it is an object of the present invention to provide a cable stringing apparatus and method which overcomes the above named disadvantages.

Another object of the invention is to provide a cable stringing apparatus and method of the above character which is particularly adapted for stringing cable through trees and on the field side of poles.

Another object of the invention is to provide a cable stringing apparatus and method of the above character in which the cable or strand as it is strung is always in a relatively taut condition.

Another object of the invention is to provide a cable stringing apparatus and method of the above character in which fewer passes are required for stringing a cable.

Another object of the invention is to provide a cable stringing apparatus and method of the above character in which cable can be strung by a crew of two with utmost safety.

Another object of the invention is to provide cable stringing apparatus of the above character which includes a portable motor operated winch for pulling the strand or cable.

Another object of the invention is to provide cable stringing apparatus of the above character in which the small motor operated winch is completely enclosed so that it can be left unattended.

Another object of the invention is to provide cable stringing apparatus of the above character in which the winch is provided with a tube running upwardly from the winch to prevent children and the like from coming into contact with the cable.

Another object of the invention is to provide cable stringing apparatus of the above character in which automatic means is provided for placing a predetermined tension on the winch line as it is payed out.

Additional objects and features of the invention will appear from the following description in which the preferred embodiments have been set forth in detail in conjunction with the accompanying drawings.

Referring to the drawings:

FIGURE 1 is a plan view showing my cable stringing apparatus and method in use.

FIGURE 2 is an enlarged side elevational view showing the portable motor operated winch utilized as a part of my cable stringing apparatus.

FIGURE 3 is a cross sectional side elevation view showing the construction of the motor operated winch.

FIGURE 4 is a cross sectional view in plan showing the construction of the motor operated winch.

FIGURE 5 is a detailed view of the cable tension sensing device which is a part of the motor operated winch.

FIGURE 6 is a detailed view taken along the line 6—6 of FIGURE 5.

In general, my method for stringing an elongate flexible element such as strand or cable makes it desirable to utilize certain apparatus. In particular, it is desirable to utilize a self-propelled vehicle having mounted thereon a workman's basket which can be raised and lowered, extended and retracted and rotated about a horizontal axis, and which also has mounted thereon reel carrying means adapted to carry a pair of reels, one of the reels carrying strand and the other of the reels carrying cable. Such apparatus is described in my copending application Serial No. 9,726, filed February 19, 1960, entitled "Apparatus for Placing Aerial Telephone Cable and Messenger." On such apparatus it is desirable that brake means be provided so that a predetermined tension can be maintained on the cable or strand as it is withdrawn from the reels.

In practicing my method, it is desirable to have a small motor operated winch which has wound thereon a winch line in the form of a relatively light flexible elongate element and which also is provided with means for maintaining a predetermined tension on the winch line as it is withdrawn from the winch.

In general, my method consists of the steps of placing the winch at the first pole of a pole line upon which it is desired to place a cable. The winch line is secured to the workman's basket of the self-propelled vehicle and the self-propelled vehicle is advanced along the pole line to withdraw the winch line under tension. Sheaves are placed on the poles to support the winch line as it is withdrawn from the winch. After the winch line has been placed on all of the poles, the line is secured to the strand mounted on the reel of the vehicle. The motor operated winch is then operated to pull the strand from its reel under tension and to pull the same through the sheaves as the winch line is withdrawn by the motor operated winch. After the strand has been pulled through all the sheaves, the end of the strand next to the vehicle is dead ended, after which the strand is placed under full tension and the other end is dead ended. Cable blocks are placed on the strand and the flexible elongate element is withdrawn from the winch by use of the self-propelled vehicle and placed in the cable blocks. The winch line is then attached to the cable on the vehicle. The cable is then withdrawn from its reel and pulled through the cable blocks by retracting the winch line. The cable is then lashed to the strand and the cable blocks are removed from the strand as the cable is lashed.

The motor operated winch 10 used in practicing my method is shown in FIGURES 2–6 and consists of a framework 11 having a pair of rubber-tired ground engaging wheel 12 mounted thereon. A pair of handles 13 is secured to the framework and is provided to facilitate movement of the motor operated winch from one position to another. A reel 14 is rotatably mounted in the framework and, as shown, is affixed to the shaft 16 carried by a pair of bearings 17 affixed to the framework 11.

Suitable means is provided for driving the reel and consists of an air-cooled gasoline motor 18 which has an output shaft 19. The output shaft 19 is connected to an electric brake and clutch unit 21 of a suitable type such as one manufactured by Warner Electric Brake & Clutch Co., of Beloit, Wisconsin. The output shaft 22 drives a sprocket 23 which drives a chain 24. The chain drives a large sprocket 26 affixed to the main shaft 16.

Means is provided for maintaining a predetermined tension on the winch line 29 in the form of a flexible elongated element which is wound on the reel 14 as the line is withdrawn from the reel. The winch line can be formed of any suitable material such as rope or finely woven stainless steel cable of the same type as the control cables on aircraft to provide a relatively light and very strong winch line which is easy to handle. Such means consists of cable feeling means and means controlled by the cable feeling means for controlling the operation of the combination brake and clutch unit 21. The cable feeling means consists of a dual threaded shaft 31 rotatably mounted in bearings 32. The shaft 31 is driven by a sprocket 33 affixed to the shaft. The sprocket 33 is driven by a chain 34 which is driven by a sprocket 36 secured to the main shaft 16.

A carrier 37 is mounted on the shaft 31 and is adapted to be moved axially of the shaft as the shaft is rotated. It will be noted that the shaft is threaded in such a manner that the carrier 37 will first be moved in one direction, and then will be moved in an opposite direction so that it will follow the winch line as it is unwound from the reel. The carrier is provided with three fixed rollers 38 which are normally disposed on one side of the flexible elongate element 29 and a pair of movable rollers 39 which are adapted to engage the other side of portions of the cable intermediate the three rollers. The movable rollers 39 are carried by a yoke 41 which has a rod-like extension 42 slidably mounted in portions 43 of the carrier. A spring 44 is provided for yieldably urging the rollers 39 into engagement with the winch line. A collar 46 is slidably mounted on extension 42 and is provided for adjusting the force supplied by the spring.

The extension member 42 is connected to and adapted to operate a rheostat 47. The rheostat 47 is connected to a suitable power supply such as a battery 48 mounted upon the framework to control the application of energy to the brake and clutch unit 21 in accordance with the tension on the elongate member 29. The rheostat 47 may be of a type well known to those skilled in the art and includes a wiper element 49 and a resistance element 50.

If desired, alternative means may be provided for maintaining a predetermined tension on the winch line in the place of the means hereinbefore described. For example, such means can consist of a fluid clutch in place of the brake and clutch unit 21. In place of the rheostat 47, a direct mechanical linkage can be connected from the extension 42 to the throttle of the gasoline engine. The gasoline engine can then be continuously operated to apply rotative forces to the reel so that as the winch line is withdrawn from the reel, the winch line would be withdrawn in opposition to the force applied by the fluid clutch. The cable feeling means feels the tension on the line and controls the throttle of the gasoline engine so that a predetermined tension is maintained on the winch line as it is withdrawn from the reel.

The motor operated winch also includes a pair of cup-shaped blocks 51 mounted on the framework 11 and which are provided with chains 52 so that the motor operated winch can be secured to the pole as shown particularly in FIGURES 2 and 3. A housing 53 is mounted on the framework 11 and serves to enclose all the operating parts of the motor operated winch. A multi-section telescoping tube 54 is mounted on the upper end of the housing and is positioned in such a manner that the flexible elongate element can pass through the same. The tube is adapted to be secured to a pole by clamp 56 as shown in FIGURE 2. The lower end of the tube 54 is provided with a ball joint 57 to permit swivel movement of the telescoping tube.

The self-propelled vehicle having a workman's basket mounted thereon is described in detail in my copending application Serial No. 9,726, filed February 19, 1960. For that reason, it will not be described in detail herein. In general, however, it does consist of a self-propelled wheeled vehicle 61 upon which is mounted a lift supporting structure 62. The lift supporting structure is mounted for rotational movement about a vertical axis. An extensible boom structure 63 is mounted on the lift supporting structure and is adapted to be raised and lowered about a horizontal axis. A workman's basket 64 is mounted on the outer end of the boom structure and carries a control unit (not shown) by which the operator in the workman's basket may control his movement. Reel carrying means adapted to carry a pair of reels such as a cable reel 66 and a strand reel 67 is mounted on the vehicle forward of the boom structure.

The practice of my method with the above described apparatus may now be briefly described as follows. Let it be assumed that it is desirable to place a length of new telephone cable on a pole line which is already in place and that it is necessary to place the cable on the field side rather than on the road side of the pole line because the road side of the pole line has already been utilized. The crew of two loads the reels of strand and cable onto the vehicle 61 in a manner described in my copending application Serial No. 9,726, filed February 19, 1960. A motor operated winch of the type described herein is also loaded onto the vehicle. The vehicle is then driven to the job site.

As soon as the vehicle arrives at the job site, the motor operated winch is unloaded from the truck by the two men and placed at the first pole and secured in place as shown in FIGURE 2 with the tube 54 extended and secured to the pole. The winch line is pulled from the tube 54 and placed through a sheave 71 mounted on the pole by the operator in the workman's basket of the vehicle. The sheave 71 can be of any suitable type such as the pole mounted blocks identified by type number G1023 manufactured by General Machine Products of Philadelphia, Pa. The end of the winch line is then secured to the vehicle in a suitable place such as on the workman's basket so that the winch line can be pulled by the vehicle. The rheostat control 47 is adjusted to apply the proper amount of braking force to the reel 14. If the fluid clutch is utilized, the motor is started to apply the braking force to the reel.

It should be pointed out that if the winch line 29 is formed of a conducting material, it is desirable to utilize a small piece of rope formed of suitable insulating material such as nylon for connecting the winch line to the workman's basket. Preferably, approximately six feet should be utilized. This short piece of insulating material is utilized to prevent injury to the workmen in the event the winch line should accidentally come in contact with a high voltage power line.

After this has been accomplished, one of the crew drives the vehicle, whereas the other of the crew remains in the workman's basket. The vehicle is advanced down the road and the winch line is pulled under tension from the motor operated winch against the brake unit 21 or against the fluid clutch unit if that is utilized in place of the brake and clutch unit 21. As soon as the second pole is reached, the vehicle is halted and the operator in the workman's basket mounts another sheave on the pole and unhooks the winch line from the workman's basket and passes it through the sheave. When the fluid clutch is being utilized on the winch, the fluid clutch immediately takes up any slack which may occur as the winch line is released so that continuous substantially uniform tension is maintained on the line.

To prevent the winch line from being accidentally dropped by the operator, a second line of insulating material may be secured to the winch line and tied to the basket. When the first insulating line has been placed through the sheave and secured to the workman's basket, the second insulating line can be released and passed through the sheave.

The same procedure is utilized when the vehicle is advanced to pole No. 3. It will be noted from FIGURE 1 that there are trees disposed between poles 3 and 4 through which the cable must pass. The winch line is threaded through the branches of the trees by the operator by moving the boom structure in and out between the branches of the trees. The movable workman's basket makes it very easy to accomplish this. After the winch line has been passed through the trees, it is again mounted on the fourth pole in a manner similar to that hereinbefore described. The same procedure may be utilized for mounting the winch line on any additional poles in the pole line along which it is desired to string the cable.

During all the time that the winch line is being pulled by the self-propelled vehicle, the winch line is maintained under continuous and substantially uniform tension so that it cannot accidentally come into contact with brush, cars, power lines and the like. For that reason, there will be no snapping or whipping of the winch line which could readily cause injury to nearby objects and persons.

After the flexible elongate element has been mounted on all of the desired poles, the vehicle is halted in a position similar to that shown in FIGURE 1. The winch line is then secured to the end of the strand or messenger carried by the reel 67 on the vehicle. While this is being done, the other member of the crew can walk back to the motor operated winch. If only the electrically operated brake was being utilized for tensioning the winch line, the gasoline engine is started. If the fluid clutch was being utilized as hereinbefore described, the gasoline motor would be operating at this time. Then through suitable communicating means such as a walkie-talkie, the two crewmen communicate with each other. The crewman at the vehicle advises the crewman at the winch as soon as he has completed connecting the winch line to the strand. The operator at the winch then speeds up the engine and causes it to rewind the winch line and to pull the strand from the reel 67 through the sheaves mounted on the poles.

After the messenger or strand has been pulled through all the sheaves mounted on the poles, the strand is dead ended at the pole nearest the vehicle. However, if there remains a portion of the job in the clear with no obstructions such as trees between the poles, the brake can be set on the winch and the remainder of the messenger or strand can be strung on the field side or on the road side of the poles in a conventional manner by driving the vehicle forward from the point beyond the obstructions. When there are obstructions such as trees between the poles, the problems are the same whether field side or road side placement is being used. It is in such situations that my method and apparatus are particularly useful. As soon as all the strand has been payed out or as soon as the end of the job has been reached, the strand is dead ended at that particular pole. The truck or vehicle 61 then returns to the winch. The messenger would then be placed under full tension by suitable means such as a conventional chain hoist and dead ended at the first pole. It should, however, be pointed out that if desired the messenger can be dead ended first at the winch pole and then placed under tension and dead ended at the other end.

After the messenger or strand has been placed under full tension and dead ended, the sheaves are removed and the strand is secured to the pole with conventional hardware. Suitable cable blocks are then mounted on the strand or messenger such as those manufactured and sold by General Machine Products of Philadelphia, Pa., and identified by type number 47–P–603–2. As the blocks are placed on the messenger, the winch line 29 is passed through the blocks by pulling the winch line with the vehicle 61 in a manner similar to that hereinbefore described. The winch line 29 is also passed through the trees between the poles 3 and 4 in a similar manner. As soon as the winch line has been advanced to the point where the messenger has been dead ended, the vehicle is stopped and the winch line is secured to the cable carried by the reel 66. The other operator again walks back to the winch. The operator at the vehicle informs the operator at the winch through the intercommunication system when he should start the winch to draw the cable through the cable blocks by winding the winch line onto the winch drum.

After the cable has been pulled through the cable blocks by the winch, the winch line is removed and the winch motor is shut off. The operator for the winch then climbs in the workman's basket and mounts a cable lasher of a conventional type on the strand or cable. The lasher is towed by the vehicle and lashes the cable to the strand in a conventional manner. As the lashing is accomplished, the cable blocks are removed.

Although my method and apparatus has been described primarily in conjunction with the stringing of cable supported by a messenger, it can also be utilized with self supported cable, that is, cable of the type which is sufficiently strong in tension to support itself when suspended from poles. With such cable the winch line need only be extended and retracted once to pull the cable back to the winch. The cable can then be supported directly on the poles.

It is apparent from the foregoing that I have provided a method of cable stringing which has many advantages over conventional methods. Any size of cable or strand can be handled with ease and with utmost safety. Wire can also be strung by my method and apparatus if desired. The portable winch makes it possible to maintain a controlled tension on the winch line to eliminate the hazards of whipping into high voltage lines or dropping of the winch line onto pedestrians causing property damage.

My method and apparatus is also advantageous in that the setup time for each job will be much less. The motor operated winch is constructed in such a manner that it can be left unattended with safety. It is enclosed so that children cannot come in contact with any moving parts. The winch line as it is removed from the winch is also protected by the telescoping tubing so that children cannot come into contact with it. The winch line, since it is relatively light, can be pulled with ease and can be readily maintained under continuous uniform tension so that it will not coil or whip.

Although the power operated winch has been shown resting on the ground, if desirable, the winch can be constructed in such a manner that it can be mounted on the pole at a height above the ground so that children cannot come in contact with it.

I claim:

1. In a method for stringing a cable supported by a strand on a plurality of poles arranged in a pole line, placing sheaves on the poles, stringing a relatively light elongate flexible element under continuous and substantially uniform tension through the sheaves, attaching the flexible elongate element to the strand, pulling the strand under continuous and substantially uniform tension through the sheaves on the poles by withdrawing the flexible elongate element from the sheaves, dead ending one end of the strand, placing the strand under tension, dead ending the other end of the strand, removing the sheaves from the poles, attaching the strand to the poles, placing cable blocks on the strand, pulling the flexible elongate element under continuous and substantially uniform tension through the cable blocks, securing the end of the flexible elongate element to the cable, pulling the cable through the cable blocks under continuous and substantially uniform tension by withdrawing the flexible elongate element from the cable blocks, lashing the cable to the strand, and removing the cable blocks as the cable is lashed to the strand.

2. In a method for stringing a cable supported by a strand on a plurality of poles arranged in a pole line with the use of a small motor operated winch having wound thereon a relatively light winch line and having means for maintaining a predetermined tension on the winch line as it is withdrawn from the winch, and with the use of a vehicle having mounted thereon a workman's basket which can be raised and lowered, extended and retracted and rotated about a vertical axis, a pair of reels mounted thereon, one of the reels carrying strand and the other of the rells carrying cable, and means for maintaining a predetermined tension on the cable or strand as it is withdrawn from the reels, the method comprising the steps of placing the motor operated winch at the first pole in the pole line, securing the winch line to the vehicle, placing sheaves on the poles, pulling the winch line through the sheaves with the vehicle, maintaining the winch line under continuous substantially uniform tension, attaching the winch line to the strand on the vehicle after it has been pulled through the sheaves, pulling the strand through the sheaves by retracting the winch line, maintaining continuous substantially uniform tension on the strand as it is pulled through the sheaves, dead ending one end of the strand, placing the strand under tension, dead ending the other end of the strand, removing the sheaves from the poles and securing the strand to the poles, placing cable blocks on the strand, attaching the winch line to the vehicle, advancing the vehicle to pull the winch line, maintaining the winch line under continuous substantially uniform tension as it is being pulled, placing the winch line in the cable blocks as the vehicle is advanced past the cable blocks, securing the end of the winch line to the cable, pulling the cable through the cable blocks by withdrawing the winch line from the cable blocks, maintaining the cable under continuous substantially uniform tension as it is being pulled into the cable blocks, lashing the cable to the strand, and removing the cable blocks from the strand as the lashing progresses.

3. A method as in claim 2 wherein the strand and cable are placed on the field side of the poles while advancing the vehicle along the road side of the poles.

4. In a method for stringing a cable supported by strand on a plurality of poles arranged in a pole line, stringing a relatively light line while under continuous substantially uniform tension and supporting the same on the poles to permit movement of the line relative to the poles, attaching the line to the strand, pulling the strand under continuous substantially uniform tension by withdrawing the line, mounting the strand on the poles, stringing the line while under continuous substantially uniform tension, securing the line to the strand to permit movement of the line relative to the strand, securing the line to the cable, pulling the cable while under continuous substantially uniform tension by withdrawing the line, and securing the cable to the strand.

5. A method as in claim 4 together with the steps of tensioning the strand and dead ending both ends of the same.

6. In a method for stringing an elongate flexible element on a plurality of poles arranged in a pole line, placing sheaves on the poles, stringing a winch line under continuous and substantially uniform tension through the sheaves, attaching the winch line to the elongate flexible element, pulling the elongate flexible element under continuous and substantially uniform tension through the sheaves on the poles by withdrawing the winch line from the sheaves, and supporting the elongate flexible element from the poles.

References Cited in the file of this patent

UNITED STATES PATENTS

| | | |
|---|---|---|
| 2,090,445 | Fultz et al. | Aug. 17, 1937 |
| 2,120,637 | Doorne | June 14, 1938 |
| 2,476,953 | Bennett | July 26, 1949 |
| 2,490,032 | Cunningham | Dec. 6, 1949 |
| 2,494,383 | Foran | Jan. 10, 1950 |
| 2,498,286 | Mahnke | Feb. 21, 1950 |